United States Patent
Berger et al.

(10) Patent No.: US 7,063,564 B2
(45) Date of Patent: Jun. 20, 2006

(54) ELECTRONIC EQUIPMENT RACK HAVING CABLES CARRYING BOTH RADIO FREQUENCY AND CODED CONTROL SIGNALS

(75) Inventors: Werner Berger, Ditzingen (DE); Friedemann Weiss, Gärtringen (DE); Bernhard Stascheit, Braunschweig (DE)

(73) Assignees: Alcatel, Paris (FR); Fuba Communications Systems GmbH, Bad Salzdetfurth (DE)

( * ) Notice: Subject to any disclaimer, the term of this patent is extended or adjusted under 35 U.S.C. 154(b) by 1026 days.

(21) Appl. No.: 09/986,866

(22) Filed: Nov. 13, 2001

(65) Prior Publication Data

US 2002/0095690 A1 Jul. 18, 2002

(30) Foreign Application Priority Data

Nov. 11, 2000 (DE) .............................. 100 56 056

(51) Int. Cl.
*H01R 9/05* (2006.01)

(52) U.S. Cl. ..................................................... 439/578

(58) Field of Classification Search ................ 439/578, 439/49, 577, 580, 63; 361/796; 455/90
See application file for complete search history.

(56) References Cited

U.S. PATENT DOCUMENTS

| 4,696,060 A | * | 9/1987 | Oswald ........................ 398/18 |
| 5,136,411 A | * | 8/1992 | Paik et al. .................... 398/72 |
| 5,282,193 A | * | 1/1994 | Iino et al. .................... 370/228 |
| 6,144,561 A | | 11/2000 | Cannella, Jr. et al. |
| 2002/0098810 A1 | * | 7/2002 | Murakami ................... 455/90 |

FOREIGN PATENT DOCUMENTS

| EP | 0419137 A2 | | 3/1991 |
| JP | 09-046110 | * | 2/1997 |
| JP | 217805/2002 | * | 2/2002 |
| WO | WO 0065831 | | 11/2000 |

* cited by examiner

Primary Examiner—Chandrika Prasad
(74) Attorney, Agent, or Firm—Sughrue Mion, PLLC

(57) ABSTRACT

A rack, in particular for cable television, having a number of modules whose inputs and outputs are connected by means of cables for the transmission of radio frequency signals and control signals, is described. The modules (2) are connected via the common inputs and outputs by means of coaxial cables (3) which carry radio frequency signals as well as coded control signals.

6 Claims, 2 Drawing Sheets

ELECTRONIC EQUIPMENT RACK HAVING CABLES CARRYING BOTH RADIO FREQUENCY AND CODED CONTROL SIGNALS

BACKGROUND OF THE INVENTION

The invention concerns a module rack, in particular for cable television, having a number of modules whose inputs and outputs are connected to cables for the transmission of radio frequency signals and control signals, modules being connected via the common inputs and outputs by coaxial cables which carry both radio frequency signals and coded control signals.

The invention is in the field of broadband radio frequency transmission, in particular HFC (hybrid fibre coax) transmission for CATV systems.

The invention is based on a priority application DE 100 56 056.3 which is hereby incorporated by reference.

The use of coaxial cables for connecting the inputs and outputs of modules is known in radio frequency transmission systems. These cables carry broadband, analogue radio frequency signals. Other cable connections (digital bus) which carry digital signals for the management of the radio frequency transmission system, for example redundancy, identification purposes, etc., are usually provided. These connections can also be made via coaxial cable.

The use of two cables for interconnecting the different modules involves increased costs. Moreover, the amount of cabling is increased and the cabling in the rack becomes confused.

SUMMARY OF THE INVENTION

The object of the present invention is therefore to reduce the costs and the cable outlay for such racks and to provide a clearer layout for the cabling within the rack.

This object is achieved by the features contained in rack, in particular for cable television, having a number of modules whose inputs and outputs are connected to cables for the transmission of radio frequency signals and control signals, modules being connected via the common inputs and outputs by coaxial cables which carry both radio frequency signals and coded control signals.

Further advantageous developments of the invention are contained in the sub-claims.

In addition to the advantages directly resulting from the problem definition, the invention further has the advantage that the cable previously additionally employed is replaced in a particularly simple manner by a circuit provided on the modules.

BRIEF DESCRIPTION OF THE DRAWINGS

The invention is explained in more detail with the aid of the exemplary embodiments schematically represented in FIGS. 1 and 2, wherein.

DETAILED DESCRIPTION OF THE INVENTION

The amplifier point consists of a rack 1, for a number of modules 2. At their front side the modules 2 have inputs and outputs, not shown in detail, via which the modules 2 are interconnected via coaxial cables 3. The useful signals are distributed or forwarded, respectively, and control signals are also transmitted via the coaxial cables 3. The inner conductor of the coaxial cable 3 is additionally used for forwarding control signals for the state estimation of connected modules.

The clarity of the connections between the modules inside the confined limits of the rack is considerably improved by the use of only one coaxial cable for the simultaneous transmission of both the useful signals and the control signals.

Figure 1:
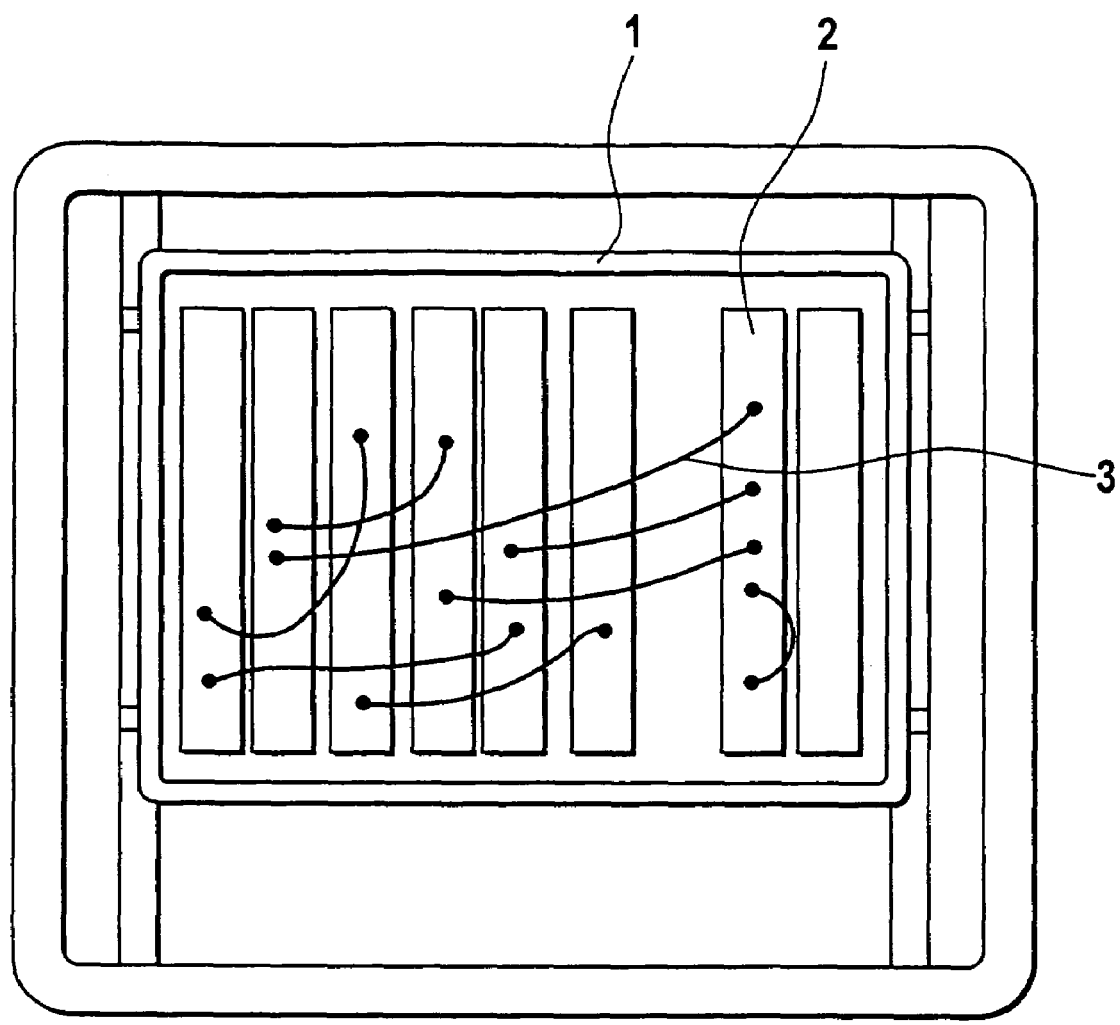
FIG. 1 is a plan view of an amplifier rack according to the present invention.
Figure 2:
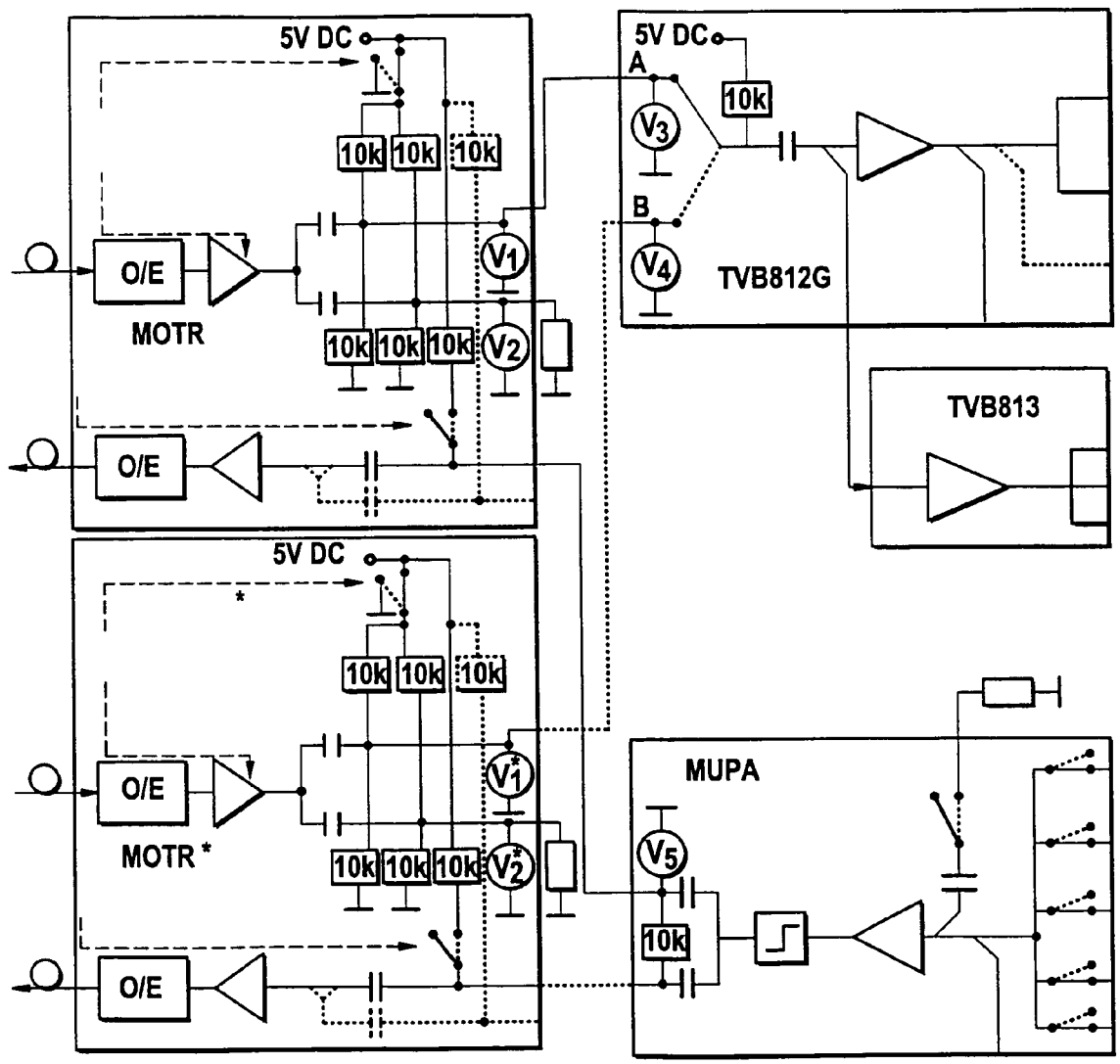
FIG. 2 is a circuit diagram of circuitry useful in generating coded control signals.

FIG. 2 shows a circuit with which the control signal can be generated.

The transceiver MOTR signals whether optical power is applied to its input; if so, the first switch is closed so that—in addition to the RF signal—a positive DC voltage potential is present at both symmetrical outputs. By measuring the voltages $V_3$ and $V_4$, the amplifier TVB can thus decide which input A or B is carrying a valid RF signal. As a rule, it switches to input A and changes over to input B only where A carries no RF signal ($V_3$<3 V) and B carries an RF signal ($V_4$<3 V).

By means of a 10 kΩ resistor connected to +5 V, the amplifier TVB signals the input to which it is switched. By measuring the potential at the output ($V_1$ and $V_2$) the transceiver MOTR can decide whether the amplifier TVB is connected to both its outputs, and it must therefore switch on its output amplifier. The output amplifier is only switched on if Pin=O.K. and one of the outputs is selected by an amplifier TVB ($V_1$>3 V or $V_2$>3 V).

The voltmeter and resistance values represented in the figure are not accurate descriptions, rather symbolic substitute representations to establish the operation.

The illustrated amplifier modules are able to effect the redundancy circuit by means of DC voltage signals on the coaxial cables.

The network management of the frequency expansion for the frequency range expansion in the cable television network to 826 MHz and the implementation of a high-capacity backward channel using BK 450 technology can be advantageously realised with the aid of the measures according to the invention.

The invention claimed is:

1. A rack, in particular for cable television, having a number of modules whose inputs and outputs are connected to cables for the transmission of radio frequency signals and control signals, modules being connected via the common inputs and outputs by coaxial cables which carry both radio frequency signals and coded control signals.

2. The rack according to claim 1, wherein a DC voltage used for the control signals and the control signals are added to the radio frequency signals by means of frequency-division multiplex.

3. The rack according to claim 1, the control signals being coded by different DC voltage levels.

4. The rack according to claim 1, the modules containing circuits for coding the control signals.

5. The rack according to claim 1, the modules containing circuits which combine the radio frequency signals and the control signals, so that these are fed via common inputs and outputs.

6. The rack according to claim 1, the control signals being routed via the inner conductor of the coaxial cable.

* * * * *